US007422435B2

(12) United States Patent
Holt et al.

(10) Patent No.: US 7,422,435 B2
(45) Date of Patent: Sep. 9, 2008

(54) TASK-ORIENTED BOOK WITH FUNCTIONAL FEATURES FOR FACILITATING EXPERIENTIAL LEARNING

(76) Inventors: Christopher L. Holt, 5624 Bernard Pl., Edina, MN (US) 55436; Christopher R. Christenson, 7377 Meadow Grass Ct. South, Cottage Grove, MN (US) 55016

( * ) Notice: Subject to any disclaimer, the term of this patent is extended or adjusted under 35 U.S.C. 154(b) by 279 days.

(21) Appl. No.: 11/002,378

(22) Filed: Dec. 2, 2004

(65) Prior Publication Data

US 2006/0121431 A1    Jun. 8, 2006

(51) Int. Cl.
*G99B 3/00* (2006.01)
(52) U.S. Cl. .......................................... 434/322; 281/18
(58) Field of Classification Search ................. 434/155, 434/178, 322, 327, 353, 247; 281/15.1, 18, 281/16; 283/63.1, 72, 98–100, 103–105, 283/902
See application file for complete search history.

(56) References Cited

U.S. PATENT DOCUMENTS

| | | | | |
|---|---|---|---|---|
| 2,374,723 | A * | 5/1945 | Barghausen | 462/55 |
| 5,494,317 | A * | 2/1996 | Johnson | 283/72 |
| 5,522,732 | A * | 6/1996 | Roberts et al. | 434/363 |
| 5,618,112 | A * | 4/1997 | Lovell | 283/103 |
| 5,882,116 | A * | 3/1999 | Backus | 383/5 |
| 5,924,740 | A * | 7/1999 | Romans | 283/100 |
| 5,942,969 | A * | 8/1999 | Wicks | 340/286.02 |
| 6,273,425 | B1 * | 8/2001 | Westfall et al. | 273/459 |
| 6,609,713 | B1 * | 8/2003 | Heffron et al. | 273/292 |
| 6,634,949 | B1 * | 10/2003 | Briggs et al. | 463/42 |
| 6,814,663 | B2 * | 11/2004 | Edwards et al. | 463/9 |
| 6,895,238 | B2 * | 5/2005 | Newell et al. | 455/414.2 |
| 6,932,698 | B2 * | 8/2005 | Sprogis | 463/9 |
| 6,957,038 | B1 * | 10/2005 | Gartner et al. | 434/354 |
| 7,158,798 | B2 * | 1/2007 | Lee et al. | 455/456.3 |
| 2005/0230958 | A1 * | 10/2005 | Payne et al. | 283/72 |

OTHER PUBLICATIONS

GRE Physics Test Practice Book, 2001 [retrieved online Jan. 3, 2007].*
JMET 2003 Information Brochure [retrieved online Jan. 3, 2007].*
New Mexico High School Standards Assessment: Test Administration Manual, 2003 [retrieved online Jan. 3, 2007].*
"College Board—SAT—Calendar & Fees", Aug. 5, 2003 [retrieved online Jun. 26, 2007].*
Marnie Swedberg, "Marnie's Scavenger Hunt Handbook", May 2004 [retrieved online Sep. 13, 2007].*
"Welcome to the Pumpkin Shell", Jun. 26, 2001 [retrieved online Sep. 13, 2007].*

* cited by examiner

*Primary Examiner*—Kurt Fernstrom
(74) *Attorney, Agent, or Firm*—Westman, Champlin & Kelly, P.A.

(57) ABSTRACT

A book is disclosed for facilitating experiential learning. The book includes a first task packet that includes a collection of preview material that introduces a task without revealing what the task is. The first task packet also includes a collection of description material that identifies what the task is. Finally, the first task packet includes a commitment mechanism configured to discourage a reader from proceeding from the collection of preview material to the collection of description material until the reader is committed to performing the task.

20 Claims, 4 Drawing Sheets

US 7,422,435 B2

TASK-ORIENTED BOOK WITH FUNCTIONAL FEATURES FOR FACILITATING EXPERIENTIAL LEARNING

BACKGROUND OF THE INVENTION

The present invention generally pertains books. More specifically, the present invention pertains to a manner of structuring a book to encourage and facilitate a sampling of new experiences by the reader.

Innovations in the structure of books have been patented in the past. Some of these developments have been directed toward children's literature. For example, U.S. Pat. No. 6,206,699 (D'Andrea) is directed to an activity book that includes an illustrated page with at least one opening on the page through which a moldable material such as modeling clay is forced or extruded by the reader. Another example, U.S. Pat. No. 6,135,844 (D'Andrea) is directed to a children's activity book having illustrated pages with openings for the placement of edible candy such as mints or jelly beans. Yet another example, U.S. Pat. No. 6,050,604 (Ossiatzky), pertains to a coloring book with pop-up figures.

Other patented book formats are designed to facilitate a predetermined user experience that extends beyond simple reading comprehension. For example, U.S. Pat. No. 4,487,430 (Bernardin) is directed to a question and answer book wherein a question posed by the story in the book is answerable by a mechanical manipulation of the book pages. In another example, U.S. Pat. No. 6,000,986 (Kaufman) describes an interactive book having pages that include tracks or monorails for guiding a toy figure along a page. In still another example, U.S. Pat. No. 4,640,512 (Burke) discloses an interactive instructive book which guides the reader, using consecutively arranged indicia, in the assembly of a puzzle which is provided separate from the book.

In view of the forgoing, there is an on-going need for unique book formats that engage readers so as to make reading more enjoyable and/or educational.

SUMMARY OF THE INVENTION

Embodiments of the present invention pertain to a book for facilitating experiential learning. The book includes a first task packet that includes a collection of preview material that introduces a task without revealing what the task is. The first task packet also includes a collection of description material that identifies what the task is. Finally, the first task packet includes a commitment mechanism configured to discourage a reader from proceeding from the collection of preview material to the collection of description material until the reader is committed to performing the task.

DETAILED DESCRIPTION OF THE PREFERRED EMBODIMENTS

Although the present invention will be described with respect to a printed book, embodiments of the invention can be practiced with periodicals, electronic books, other forms of electronic media such as websites et cetera without departing from the spirit and scope of the invention.

Figure 1:
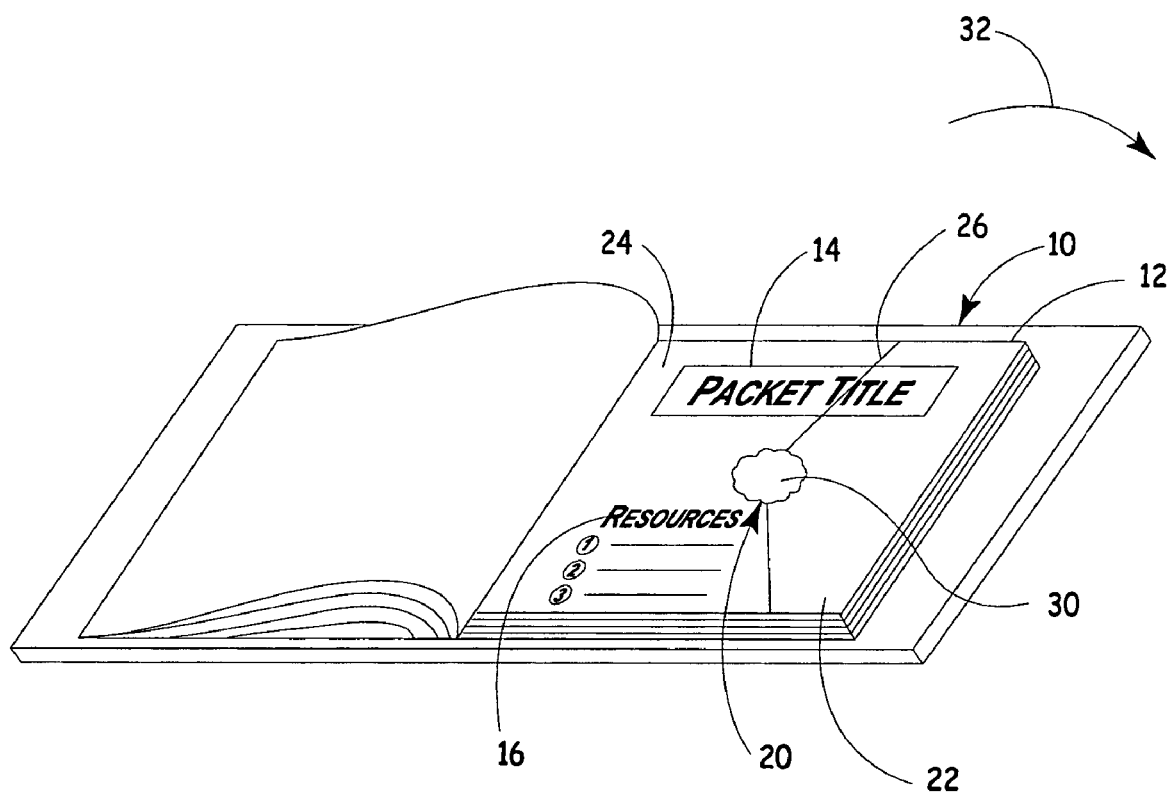
FIG. 1 is a perspective view of a book in accordance with an embodiment of the present invention.

FIG. 1 is a perspective view of a book in accordance with an embodiment of the present invention. Book 10 includes a number of task packets 12 that are each individually sealed during manufacturing and unsealed by a reader when he/she is ready to perform a task associated with a packet. Book 10 and the task packets within may have an overall theme that could be directed to a particular audience. For example, one book could be directed to guiding children through a set of science experiments each experiment being a task within the book. Another book may be directed to tourism in a geographic region such as a city. Another book might be directed to roadtrips. Yet another book could be extremely eclectic with silly tasks. Still another book could be directed to social interaction such as dating.

The commitment levels can be varied by book and/or within book. For example, an "easy" book may have only low commitment levels such as only tasks that can be completed within 1 hour and for under $20. An intermediate book may require more commitment, while an advanced book may require extended periods of time (such as a week or month) and hundreds or thousands of dollars. Moreover, a given book may include some easy tasks, some intermediate tasks and some advanced tasks.

Each task packet 12 includes preview information that preferably includes a description or title 14 that provides the reader with basic knowledge about the task within packet 12. Additionally, the preview information for each packet 12 also preferably includes a listing 16 of resources required by the reader in order to complete the task. The detailed nature or description of the task is contained within the inner pages of the task packet 12. Each packet 12 also includes a commitment mechanism 20 that ensures that the reader may not begin the task until the reader is ready. FIG. 1 illustrates one type of commitment mechanism 20. Specifically, mechanism 20 includes a page 22 that is sized larger than normal pages of the book and folded over page 24. The boundary 26 between page 22 and page 24 is then sealed by the manufacturer of book 10 with a breakable seal 30, such as a wax seal. Once the reader has acquired the resources required by listing 16, the reader breaks seal 30 and folds page 22 in the direction of arrow 32 to reveal the interior of packet 12.

Examples of resources that might be required for a given task include time resources; transportation resources (such as a bicycle or car); financial resources; specific objects or items; human resources (number of people); community resources (such as access to a library or planetarium); timing resources (such as for a task that can only be done on a Saturday); and sequencing resources (such as when a task requires the completion of another task of book 10).

The contents of packet 12 can include any suitable matter relative to the task. The contents of packet 12 include a description of the task to be completed. The contents of packet 12 can also include any suitable additional material as desired. For example, the contents of packet 12 may include specific examples of how the task can be completed; anecdotes providing amusing experiences that others have had regarding the task; general encouragement; historical background relative to the task; resources to contact for assistance or guidance for completing the task; and/or any other suitable content.

Figure 2:
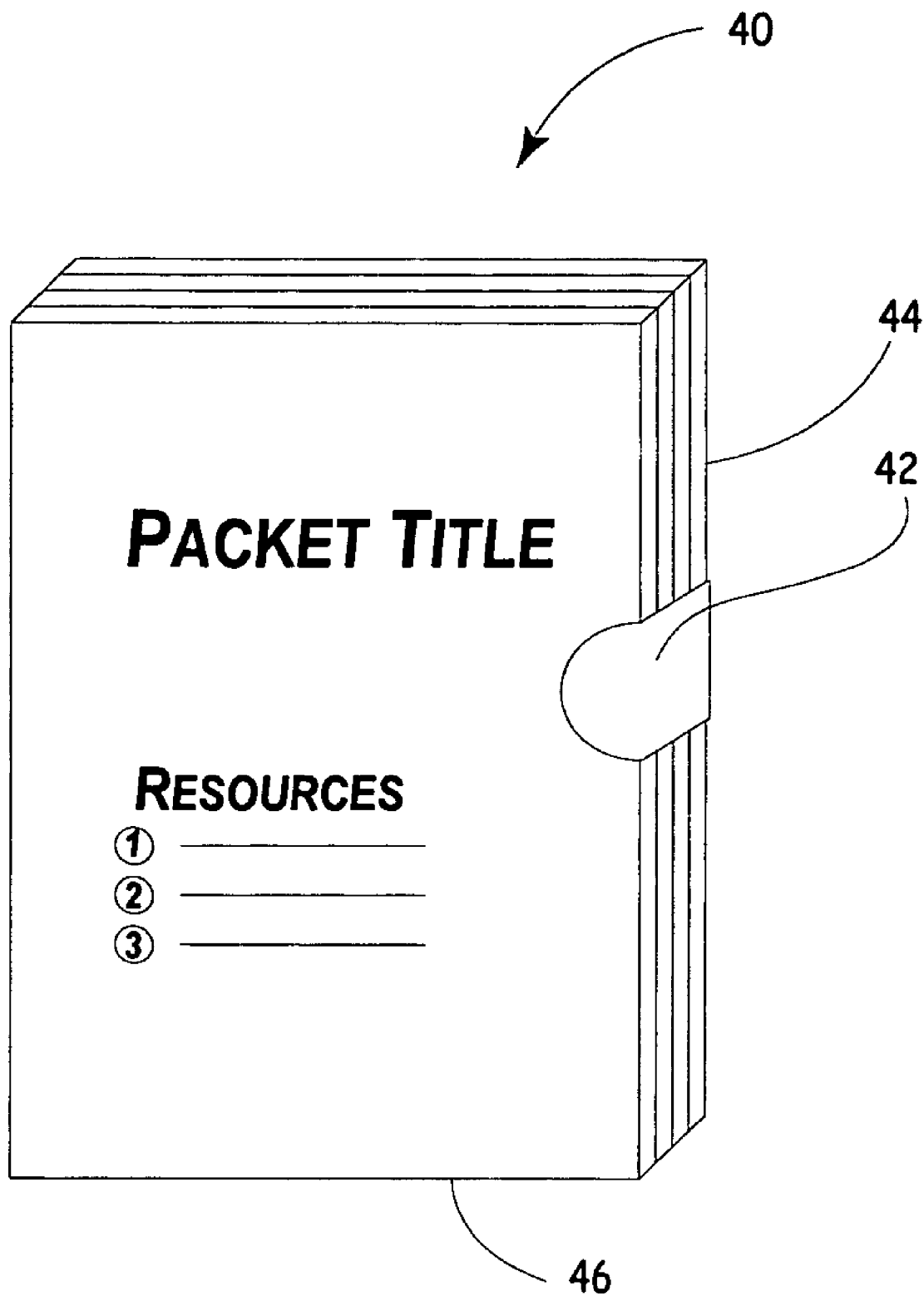
FIG. 2 is a perspective view of a task packet and commitment mechanism in accordance with another embodiment of the present invention.

FIG. 2 is a diagrammatic view of a task packet employing a commitment mechanism in accordance with another embodiment of the present invention. Packet 40 is adapted to be provided within a book (not shown in FIG. 2) and is maintained in a sealed state with sticker 42 that is applied to pages 44 and 46 of packet 40 when the book is created. Sticker 42 has an adhesive surface that adheres to pages 44 and 46 thereby sealing pages 44, 46 and all pages therebetween together. When the reader is ready to undertake the task of packet 40, sticker 42 is ripped or otherwise destroyed to allow packet 40 to open. Sticker 42 is one example of fastener adhering page 44 to page 46. Additional types of fasteners can also be used such as Velcro, snaps, or a latch. However, it is preferred that the mechanism be irreparably damaged when unsealed.

Figure 3:
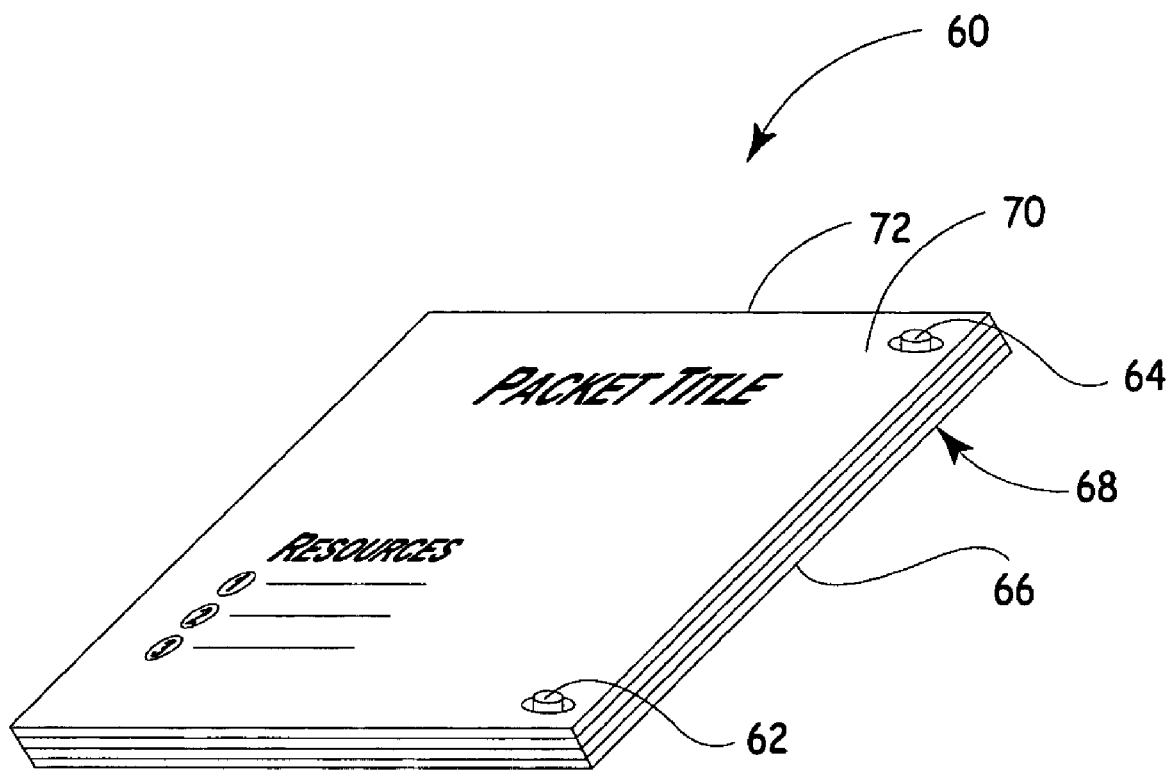
FIG. 3 is a perspective view of a task packet and commitment mechanism in accordance with another embodiment of the present invention.

FIG. 3 is a perspective view of a task packet and commitment mechanism in accordance with another embodiment of the present invention. Packet 60 is similar to packets 12 and 40, described above, but differs in its commitment mechanism. Specifically, packet 60 includes one or more posts 62, 64 that are affixed to page 66 and pass through holes in intermediate pages 68 and extend to or beyond surface 70 of page 72. A breakable material, such as wax, is then applied to posts 62, 64 and page 72 in order to adhere the posts to page 72 thereby sealing pages 68 between page 66 and page 72.

Figure 4:
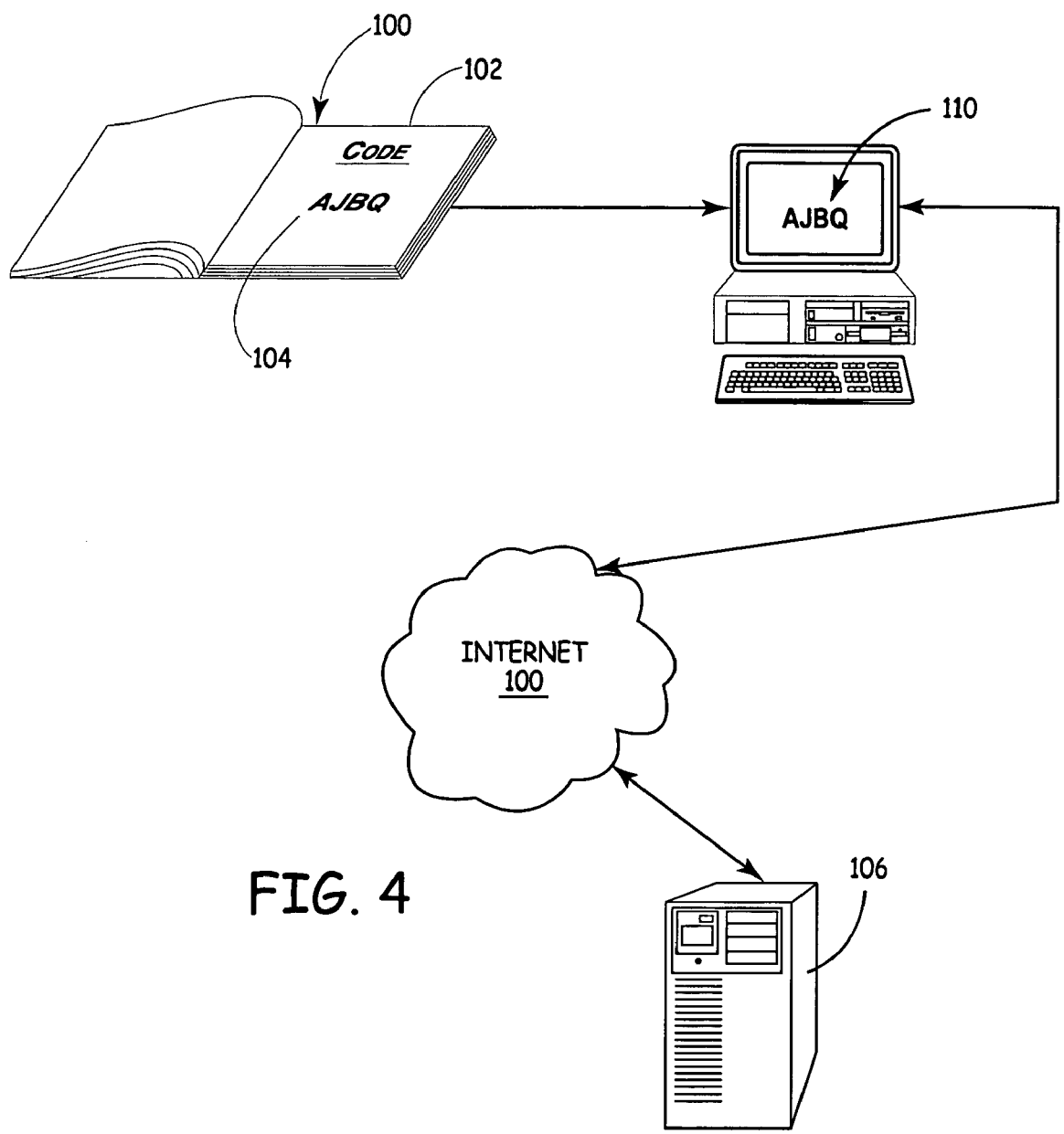
FIG. 4 is a diagrammatic view of a system for communicating unique information within a task packet to a centralized server in accordance with an embodiment of the present invention.

FIG. 4 is a diagrammatic view of a system for communicating unique information within a task packet to a centralized server in accordance with an embodiment of the present invention. FIG. 4 illustrates a book 100 in accordance with an embodiment of the present invention. Book 100 includes a task packet 102 that has been unsealed by a reader to reveal a codeword or password 104. The reader is then directed to convey codeword 104 to server 106, which is preferably a web server connected to internet 108. In the embodiment illustrated in FIG. 4, the reader will direct a web browser running on computer 110 to a web address of server 106, which address is provided by packet 102 when opened. Once the reader's web browser is properly directed to server 106, the reader is requested to enter the codeword 104. Provision of codeword 104 can be used for a number of features. First, entry of codeword 104 can begin a real-world timer that requires that the reader complete the subtask within a specified amount of time provided by either subtask 102 or server 106. Additionally, server 106 can provide the user with updated information relative to task 102. The updated information can be any suitable information including information developed or generated after the publishing of book 100. For example, updated information may include statistics about the number of people who have successfully completed the task. Additionally, updated information may modify or otherwise change the task based upon developments after the publishing of book 100. For example, if task 102 directs a reader to stay at "Jim and Betty's Bed and Breakfast" and the establishment has closed or moved since book 100 was published, the updated information may include a substitute location where the reader should stay.

Since server 106 operates in real-time, if two distinct users provide codewords 104 indicating that each reader is currently undertaking a step that requires each reader to stay at Jim and Betty's Bed and Breakfast, updated information can coordinate the activities of both users to enhance the task for each. For example, the updated information provided by server 106 can add a task to each reader that they have dinner with the other reader while staying at Jim and Betty's Bed and Breakfast.

Codeword 104 may be created by the author or publisher to be unique to each book. Additionally codeword 104 may be unique to a given task within book 100, or even unique to a given element of a task. Accordingly, the updated information provided by server 106 can be suitably scoped. If the codeword is unique to each individual book 100, then server 106 can also track book sales and/or reader progress. Moreover, server 106 can suggest vendors in the form of the updated information. The suggested vendors can be provided based upon advertising revenue that each vendor provides to a company operating server 106. For example, Jim and Betty's Bed and Breakfast may have paid ServerCo in order to have ServerCo insert a suggestion to readers to stay at Jim and Betty's during a task.

In accordance with an embodiment of the present invention. The last element of a task will provide the reader with a completion code that can be provided to server 106 to indicate that the reader has successfully completed the task. For example, Jim and Betty's Bed and Breakfast may, when asked, provide completion codes once a reader has stayed there. Optionally, each task can have an alternate completion route for a reader who simply determines that they cannot complete the task as assigned. For example, an alternate completion route may direct the reader to donate $50 to a given charity, which, in response, will provide the reader with an alternate completion code. The completion codes may also be used by server 106 to enable the reader to access forums or message boards that allow the reader to discuss his/her experience with others who have completed the task.

The table set forth below provides a number of exemplary Resources and Tasks; the table is provided for illustration only, and should not be construed as a limitation of the present invention.

| RESOURCES | TASKS |
| --- | --- |
| $75.00<br>3 hours | Eat for $25.00 and tip the waiter $50.00 |
| $100.00<br>48 hours | Spend tomorrow night in a location at least 65 miles from where you are standing right now |
| $100.00<br>48 hours | Spend the night in a different state than you are in right now |
| A friend that is different than you; a Friday or Saturday evening; and $60.00 | Borrow and wear an outfit that you would never chose for yourself and go out dancing |
| A weekend and $300 | Choose the one of these cities that is furthest from you and spend the weekend there |
| A camera and a car | Take a photograph of ten works of art |
| Baking soda vinegar | Make a volcano in accordance with the following steps . . . |
| A computer with internet access | Visit this website and learn about Harry Truman by answering the following questions . . . |
| A library | Find a book on Theodore Roosevelt and answer the following questions |
| A significant other; a whole day; a grocery store; and 5 board games | Go to the store and buy items for a picnic and spend the day playing games |
| A video store and $5.00 | Rent and watch a movie with foreign language subtitles |

Embodiments of the present invention generally employ a commitment mechanism with a book to provide a reader thereof with a significantly more interactive experience than books of the prior art. More specifically, embodiments pertain to a book that includes a first task packet that includes a collection of preview material that introduces a task without revealing what the task is. The first task packet also includes a collection of description material that identifies what the task is. Finally, the first task packet includes a commitment mechanism configured to discourage a reader from proceeding from the collection of preview material to the collection of description material until the reader is committed to performing the task.

In one embodiment, the book includes a second task packet, wherein the second task packet comprises components similar to the components of the first task packet. In one embodiment, the collection of preview material includes a listing of resources required by the reader in order to complete the task. In one embodiment, the listing of resources includes a time resource and/or a financial resource. In one embodiment, the task requires the reader to leave the location they are in when they read the collection of description material, to take a photo, to purchase something, or to visit a website. In one embodiment, the commitment mechanism incorporates a physical component such as a wax seal, a portion applied with an adhesive, a hook and loop attachment, a breakable seal or a sticker. In one embodiment, the commitment mechanism includes an explicit warning not to proceed with reading. In one embodiment, the collection of description material (and/or the preview material) includes a code word to be electronically transmitted by the reader.

Although the present invention has been described with reference to particular embodiments, workers skilled in the art will recognize that changes may be made in form and detail without departing from the spirit and scope of the invention.

What is claimed is:

1. A method of facilitating experiential learning, comprising:
   providing a book that contains a commitment mechanism that is configured to be manipulated by a reader of the book;
   instructing the reader not to manipulate the commitment mechanism until the reader is committed to performing a certain task provided within the book; and
   instructing the reader to perform the task and, by doing so, instructing the reader to leave the location they are in when they manipulate the commitment mechanism.

2. The method of claim 1, wherein the task requires the reader to take a photo.

3. The method of claim 1, wherein the task requires the reader to purchase something.

4. The method of claim 1, wherein the task requires the reader to visit a website.

5. A method of facilitating experiential learning, comprising:
   providing a book that includes a front cover, a back cover, and a plurality of pages between the front cover and the back cover;
   dividing the plurality of pages into a plurality of task packets, each task packet being associated with a task;
   providing within the book a commitment mechanism for each task packet; and
   for a given one of the task packets, instructing a reader of the book that they should not manipulate the commitment mechanisms until the reader is committed to performing the associated task.

6. The method of claim 5, wherein the method further comprises, for the given one of the task packets, the task requires the reader to leave the location they are in when they manipulate the commitment mechanism.

7. The method of claim 5, wherein the method further comprises, for the given one of the task packets, the task requires the reader to purchase something that they have not yet purchased when they manipulate the commitment mechanism.

8. The method of claim 5, wherein the method further comprises, for the given one of the task packets, the task requires the reader to visit a web site.

9. The method of claim 5, wherein the method further comprises, for the given one of the task packets, providing to the reader an explanation of what resources they will need to complete the task.

10. The method of claim 5, wherein the explanation includes an estimation as to how much of the reader's time is likely to be required to complete the task.

11. The method of claim 10, wherein the estimation is something other than a limited amount of time within which the task must be completed.

12. The method of claim 5, wherein the explanation includes an estimation as to how much of the reader's money is likely to be required to complete the task.

13. The method of claim 12, wherein the explanation is an estimation as to how much of the reader's money will be required to, as part of completing the task, purchase something after the commitment mechanism has been manipulated.

14. The method of claim 5, wherein, for the given one of the task packets, the commitment mechanism includes a physical mechanism that is manipulated by the reader, wherein the physical mechanism is configured to become irreparably damaged as a result of the manipulation by the reader.

15. The method of claim 5, wherein the physical mechanism includes a wax seal.

16. The method of claim 5, wherein the physical mechanism includes a portion applied with an adhesive.

17. The method of claim 5, wherein the physical mechanism includes a sticker.

18. The method of claim 5, wherein the physical mechanism includes a hook and loop attachment.

19. The method of claim 5, wherein the commitment mechanisms include an explicit instruction to the reader not to proceed with reading, and wherein manipulating the commitment mechanisms includes reading past the explicit instruction.

20. A book for facilitating experiential learning, wherein the book comprises:
   a front cover;
   a back cover;
   a plurality of task packets between the front cover and the back cover, wherein each task packet is associated with a task;
   a commitment mechanism for each task packet, wherein each commitment mechanism is a physical mechanism configured to be manipulated by a reader of the book; and
   an instruction that the reader can manipulate the commitment mechanisms at his or her discretion.

* * * * *